United States Patent
Ebert et al.

(10) Patent No.: US 7,056,361 B1
(45) Date of Patent: Jun. 6, 2006

(54) GAS PRODUCING SYSTEM

(75) Inventors: Andreas Ebert, Kirchheim/Teck (DE); Markus Portscher, Weilheim (DE); Martin Schüssler, Ulm (DE); Alexandra Hassert, Wangen (DE); Ralf Heuser, Ulm (DE); Oskar Lamla, Kirchheim-Nabern (DE); Tomas Stefanovski, Böblingen (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 611 days.

(21) Appl. No.: 10/088,201

(22) PCT Filed: Sep. 14, 2000

(86) PCT No.: PCT/EP00/08956

§ 371 (c)(1), (2), (4) Date: Aug. 12, 2002

(87) PCT Pub. No.: WO01/19726

PCT Pub. Date: Mar. 22, 2001

(30) Foreign Application Priority Data

Sep. 15, 1999 (DE) .................................. 199 44 187

(51) Int. Cl.
*B01J 8/04* (2006.01)
*B01J 19/00* (2006.01)
*H01M 8/04* (2006.01)

(52) U.S. Cl. .................... 48/214; 422/193; 422/211; 422/191; 48/127.9

(58) Field of Classification Search ............... 48/127.9, 48/127.7, 214; 422/191, 193, 196, 198, 200, 422/211
See application file for complete search history.

(56) References Cited

U.S. PATENT DOCUMENTS

| 5,382,271 A | * | 1/1995 | Ng et al. ...................... 48/61 |
| 5,496,655 A | * | 3/1996 | Lessing ........................ 429/34 |
| 6,096,286 A | * | 8/2000 | Autenrieth ................... 423/651 |
| 6,159,434 A | * | 12/2000 | Gonjo et al. ................ 422/191 |
| 6,531,102 B1 | * | 3/2003 | Nakamura et al. ........... 422/198 |
| 6,660,685 B1 | * | 12/2003 | Schussler et al. ............ 502/345 |
| 6,830,736 B1 | * | 12/2004 | Lamla et al. ................ 422/211 |

FOREIGN PATENT DOCUMENTS

| DE | 198 32 625 | 7/1998 |
| DE | 198 47 987 | 10/1998 |
| DE | 197 43 673 | 4/1999 |
| DE | 197 54 012 | 6/1999 |
| EP | 0 861 802 | 9/1998 |
| EP | 0913357 | 5/1999 |
| JP | 10182102 | 7/1998 |

* cited by examiner

Primary Examiner—N. Bhat
(74) Attorney, Agent, or Firm—Crowell & Moring LLP

(57) ABSTRACT

The invention relates to a device for generating a hydrogen-rich gas from a liquid, hydrogen-containing fuel using a reforming reaction, having feed lines for supplying starting materials and having discharge lines for discharging the reformate, having at least one component for evaporating liquid starting materials, having at least one component for reforming, having at least one component for the catalytic generation of thermal energy, and having at least one component for reducing the carbon monoxide fraction in the reformate, in which device at least two of the components are arranged on a common plate, which comprises a porous layer formed by pressing catalyst material, the reaction starting materials flowing over and/or through the layer.

22 Claims, 4 Drawing Sheets

GAS PRODUCING SYSTEM

BACKGROUND AND SUMMARY OF THE INVENTION

The invention relates to a device for generating a hydrogen-rich gas from a liquid, hydrogen-containing fuel using a reforming reaction device for generating a hydrogen-rich gas from a liquid, hydrogen-containing fuel using a reforming reaction, having feed lines for supplying starting materials and having discharge lines for discharging the reformate, having at least one component for evaporating liquid starting materials, having at least one component for the catalytic generation of thermal energy, and having at least one component for reducing the carbon monoxide level in the reformate.

EP 861 802 A2 has disclosed a device of the generic type, in which all the functions of a conventional gas generation system are integrated in what is known as a stacked reactor. Individual plate-like stages, which are stacked on top of one another to form a reactor, are provided for each function, i.e. for starting material preheating, evaporation, reforming, shift reaction, removal of carbon monoxide and catalytic burner. Openings are formed in the plates and, when stacked on top of one another, these openings form passages for guiding the fluids within the reactor. Heat exchange takes place between the individual stages. In addition, special plates for heat exchange are provided.

Furthermore, DE 197 43 673 A1 has disclosed the use of a catalytic converter, which has been produced by pressing at least one catalyst powder into a layer which forms a shaped body and is highly compressed, in order to generate hydrogen from hydrocarbons, it being possible to force the reaction mixture through the catalyst layer, with a pressure drop. Moreover, DE 198 47 987 A1 and DE 198 32 625 A1 have disclosed a process for producing a catalytic shaped body of this type and a process for producing a stacked reactor from catalytic shaped bodies of this type.

The object of the invention is to create a device for generating a hydrogen-rich gas which is improved in terms of mass, volume, dynamics and thermal load.

This object is achieved by a device for generating a hydrogen-rich gas from a liquid, hydrogen-containing fuel using a reforming reaction, having feed lines for supplying starting materials and having discharge lines for discharging the reformate, having at least one component for evaporating liquid starting materials, having at least one component for the catalytic generation of thermal energy, and having at least one component for reducing the carbon monoxide level in the reformate, wherein at least two of the components are arranged on a common plate which at least partially comprises a porous layer which is formed by pressing catalyst material and through which the reaction starting materials can flow, at least in regions, with a pressure drop.

The integration of a plurality or, if appropriate, all of the components on a common plate makes it possible to achieve a further improvement in terms of mass and volume. Moreover, line systems for connecting the individual components become largely superfluous, which also reduces the dead spaces which are present and therefore contributes to improving the dynamics of the entire system. Particularly when used in mobile applications, high demands are imposed in this respect. Further integration is also advantageous with regard to the cold start properties, since in this way the heat capacity of the masses which are to be heated is reduced and therefore the cold start ability is improved.

Further advantages and configurations of the invention will emerge from the subclaims and the description. The invention is described in more detail below with reference to a theoretical drawing, in which:

DETAILED DESCRIPTION OF THE DRAWINGS

Figure 1:
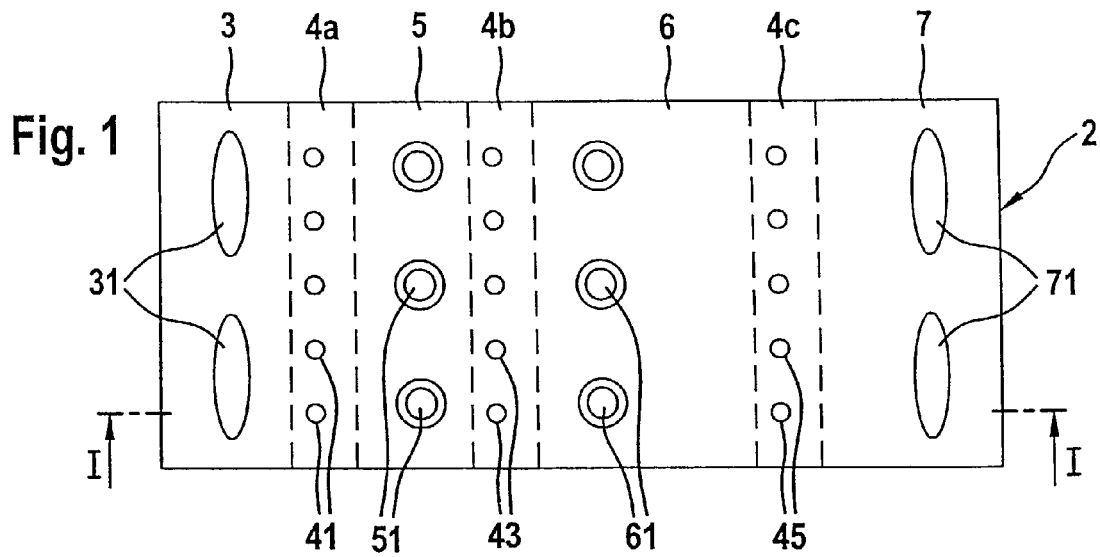
FIG. 1 shows a first exemplary embodiment of a plate according to the invention with a catalyst layer through which media can flow, with all the components integrated in one plate.
Figure 2:
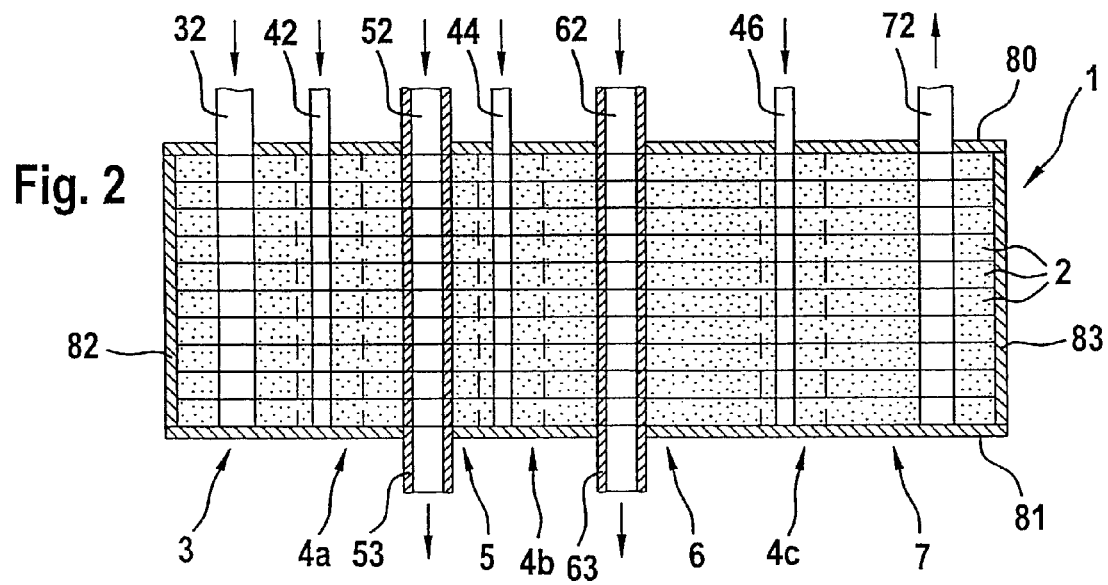
FIG. 2 shows a section through a plate stack with plates as shown in FIG. 1, on line I—I.

The device for generating a hydrogen-rich gas, which is denoted overall by 1 and is shown in FIGS. 1 and 2, comprises a plurality of plates 2 stacked on top of one another, as illustrated in each case in outline in FIGS. 1 and 2. In this exemplary embodiment, the plate 2 consists entirely of a porous layer which is formed by pressing catalyst material and through which the media involved flow with a pressure drop. The plates 2 in each case comprise a plurality of components 3–7 which in the drawing are diagrammatically separated from one another by dashed lines. In reality, the regions may also merge gradually into one another.

The component 3 is used to supply reaction starting materials, for example liquid water and air. For this purpose, two openings 31 are provided in the feed region 3 in the plate 2. When the individual plates 2 are stacked on top of one another, the openings 31 form two feed passages 32 running in the stack direction. From these feed passages 32, the water/air mixture supplied flows substantially perpendicular to the stacked direction, into the porous layer of the plate 2. The feed region 3 is adjoined by a first mixing region 4a, in which a multiplicity of openings 41 are provided. In the exemplary embodiment, these openings 41 are used to supply a liquid operating medium, for example methanol. When the individual plates 2 are stacked on top of one another, the openings 41 form a plurality of feed passages 42 running in the stack direction. From these feed passages 42, the operating medium supplied flows, likewise substantially perpendicular to the stack direction, into the porous layer of the plate 2, where it mixes with the water/air mixture. For this reason, this region is referred to as the mixing region 4a. If a sufficient temperature has already been established in this region, it is also possible for the air contained in the starting gas flow to have reacted with the operating medium supplied as early as in the first mixing region 4a, thus liberating thermal energy. For this reason, the boundaries which are shown between the regions are only for illustration, as has already been stated above.

This first mixing region 4a is adjoined by an evaporation region 5, in which, once again, a plurality of openings 51 are provided. In the exemplary embodiment, these openings 51 are used to control the temperature of the evaporation region 5. When the individual plates 2 are stacked on top of one another, the openings 51 form a plurality of heating passages 52 running in the stack direction. Unlike the passages 32 and 42 described above, the heating passages 52 are not connected in terms of flow to the porous layer 2. Rather, these heating passages are sealed in a gastight manner with respect to the porous layer 2 by means of a wall 53, so that there is no exchange of fluid between the heating passages 52 and the porous layer 2. The heating fluid which is passed through the heating passages 52 is therefore used only to heat the evaporation region 5. The seal may be effected in any desired way. For example, it is possible to produce an edge seal 53 by applying a higher compressive force to the starting material in this region. It is also possible to introduce special materials into this region, which then form a gastight edge seal 53 during the production process or in operation. Furthermore, it would be possible to introduce a gastight tube or the like into the heating passages 52. Naturally, any other form of edge seal can also be used.

Thermal energy can be supplied to the evaporation region 5 for example by passing a hot medium, for example a heat transfer oil, through the heating passages 52, which medium, as it flows through, transfers some of its thermal energy to the adjoining layer 2. However, it is also possible for the thermal energy to be generated catalytically inside the heating passages 52. For this purpose, the heating passages 52 are provided with a catalyst material in any desired form, for example in the form of a bed or a coating. An operating medium/air mixture, which is exothermically converted at the catalyst in order to generate the thermal energy, then flows through the heating passages. If the exhaust gas formed during the conversion does not contain any disruptive components, it is also conceivable to dispense with the edge seal, so that the exhaust gas is released into the gas stream flowing through the porous layer 2.

The evaporation region 5 is adjoined by a second mixing region 4b, in which, once again, a plurality of openings 43 are provided. In the exemplary embodiment, these openings 43 are used to supply further air. When the individual plates 2 are stacked on top of one another, the openings 43 form a plurality of feed passages 44 running in the stack direction. From these feed passages 44, the air supplied flows, substantially perpendicular to the stack direction, into the porous layer of the plate 2, where it becomes mixed with the evaporated water/operating medium/air mixture. This additional air is required in the adjacent reforming region 6 for what is known as the autothermal reforming. In this known reaction, operating medium, water and oxygen are converted substantially into hydrogen and carbon dioxide. However, the reformate additionally contains a small fraction of carbon monoxide.

Openings 61 may be formed in the reforming region 6, in a similar manner to in the evaporation region, in order to form further heating passages 62 with edge seals 63. Their structure and function corresponds to those described above. The reforming region 6 is adjoined by a third mixing region 4c with openings 45 and passages 46, as has already been described above with reference to the second mixing region 4b, for supplying further air. This additional air is required in the adjoining CO oxidation region 7 for selective catalytic oxidation of the carbon monoxide contained in the reformate. This reaction has likewise long been used to clean the reformate and is therefore not described in further detail. Finally, two openings 71 are provided in the CO oxidation region 7 in order to form discharge passages 72. The reaction product is then discharged from the device 1 via these discharge passages 72.

Although hitherto the text has in each case referred to air, it will be clear to the person skilled in the art that the air used may, in addition to normal ambient air, also be oxygen-enriched air or gaseous pure oxygen. Furthermore, it should be pointed out that the position and number of openings 31, 41, 43, 45, 51, 61, 71 are in each case shown only by way of example and can be adapted to the particular conditions at any time.

Overall, therefore, in this exemplary embodiment media flow through the porous layer 2 from the left to the right, with a pressure drop, in the plane of the drawing. In addition, the passages 41, 43, 45 are used to introduce additional fluids along the gas flow path into the porous layer 2 and therefore into the gas stream. The embodiment shown, in which all the components of the gas generation system are integrated in a single plate 2, represents the most compact design. However, within the context of the invention it is also possible for only some of the components to be integrated into one common plate 2. The stack of plates 2 is usually closed off by end plates 80, 81 on both sides. Furthermore, the plate stack is laterally sealed from the environment by housing walls 82, 83. However, the edge seal may also be integrated directly in the porous layer 2, as has already been described above in connection with the edge seals 53, 63 in the heating passages 52, 62. In the exemplary embodiment shown, all the fluids are supplied only by means of diagrammatically illustrated inlets in the upper end plate 80. The discharge for the reformate is likewise integrated in the upper end plate 80. Only the discharges for the heating passages 52, 62 are integrated in the lower end plate 81. Naturally, it is within the specialist ability of a person skilled in the art to provide the inlets and outlets at other suitable locations. In particular, it is also possible for media to be supplied and discharged through the housing walls 82, 83. Moreover, a plurality of passages may be combined within the end plates 80, 81.

The layer 2 is preferably formed by pressing catalyst material into a thin, large-area, highly compressed layer. Fine-grained catalyst powder or granules, the grains of which have a diameter of approx. 0.5 mm or less, is/are used as catalyst material. The pressing takes place, for example, at temperatures of approx. 200° to 500° C.

The fluids flow through the porous layer 2 under the application of pressure. The reaction mixture undergoes a pressure drop $\Delta p$ of approx. 100 mbar and above (for example 1 to 4 bar) as it flows through the porous layer 2. To provide the catalyst material with better mechanical stability and/or improved heat conduction, the catalyst material is pressed into a support structure. This support structure is a mesh-like matrix, which is preferably obtained by mixing the at least one catalyst powder with dendritic copper in powder form and pressing this mixture. During pressing, the dendritic copper forms a mesh-like matrix structure, into which the catalyst grains are "incorporated". Even if the proportion by mass of the copper powder is relatively low in relation to the overall mass of the layer, the dendritic copper powder can easily be pressed or sintered together to form a mesh, has a large surface area and is itself catalytically active. Therefore, the use of dendritic copper powder results in a stabilizing, fixing and heat-distributing mesh in the micrometer range. The layer 2 has a relatively large surface area of, for example, 100 $cm^2$. To achieve a more compact structure, the catalyst volume which the reaction mixture is to flow through is distributed over a plurality of layers which, however, are not arranged next to one another, but rather behind one another, but still connected in parallel.

To produce a stacked body, a plurality of discs which have been pressed from porous catalytic material are stacked on top of one another and sintered together while pressure is being applied. A preferred production process of this type is disclosed in DE 198 32 625 A1, in the name of the applicant.

Figure 3:
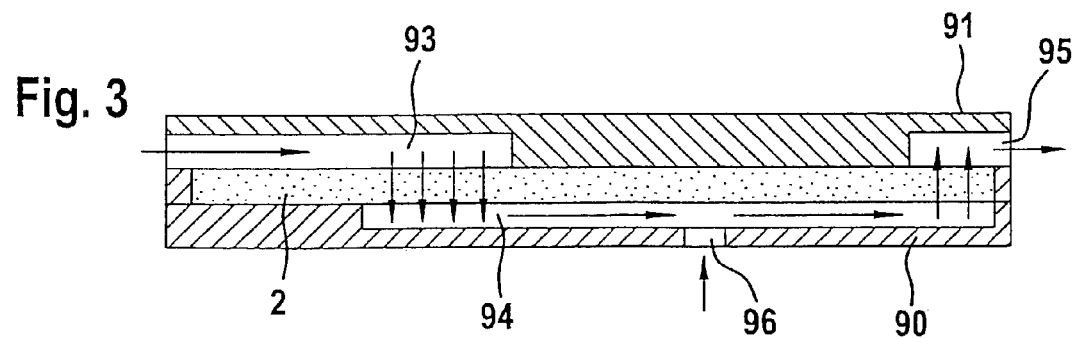
FIG. 3 shows a further exemplary embodiment of a plate according to the invention, with partial flow over and through the porous layer, partly in section.

In the exemplary embodiment shown in FIG. 3, in addition to the porous layer 2 a base plate 90 is provided. The upper base plate 91 in this outline illustration actually belongs to the next layer of a stack arrangement and is illustrated only in order to make the drawing clearer. In this case, the porous layer 2 is designed as a continuous layer of constant thickness. By contrast, the base plates 90, 91 have recesses 93 to 95 in partial regions. These recesses 93 to 95 result in partial flow over and through the porous layer 2. The fluid is passed into the recess 93 via an inlet (not shown) or a corresponding passage, and in the process flows over the adjacent layer 2. At the boundary of the recess 93, the fluid is forced to flow through the porous layer 2 in order to pass into the opposite recess 94. In the region of this recess 94, there is an opening 96 for supplying a further fluid. Once again at the boundary of the recess 94, the fluid mixture is forced once again to flow through the porous layer 2, but in this case in the opposite direction, before it is discharged, via the recess 95, to an outlet (not shown) or a corresponding passage. In a similar manner to the exemplary embodiment shown in FIGS. 1 and 2, it is possible to integrate a plurality of components within this fluid flow path. To simplify the drawing, this figure does not show a division into different regions. In addition to the one opening 96 illustrated, it is, of course, also possible in this embodiment to provide further openings or passages if required for the supply of fluids or for controlling the temperature of the regions.

The recesses 93 to 95 can be formed from abrading material from the surface of the base plates 90, 91. If appropriate, flow-guiding structures can be introduced into the spaces which form. Another possibility is for passage structures to be introduced into the base plates 90, 91. The fluid is in the process guided through the actual passages, while the porous layer 2 may be supported on the passage walls. This leads to improved stability of the device.

Figure 4:
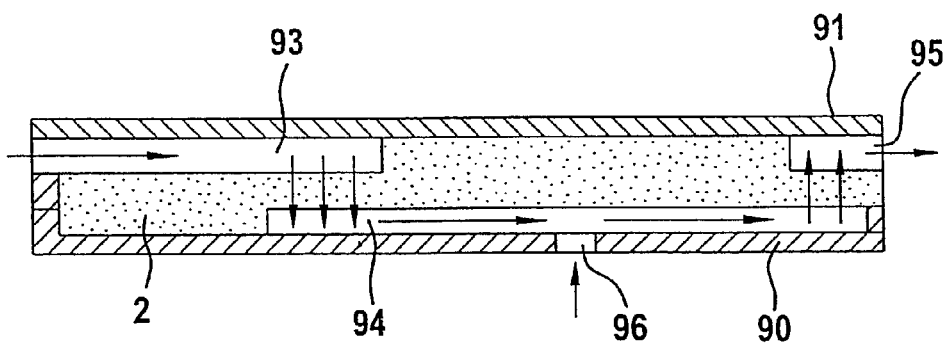
FIG. 4 shows a modification of the exemplary embodiment shown in FIG. 3.

As a modification to the exemplary embodiment shown in FIG. 3, it is also possible, as shown in FIG. 4, to dispense with recesses at the base plates 90, 91. In return, corresponding recesses 93 to 95 or passage structures are introduced into the porous layer 2. Operation corresponds to that of the exemplary embodiment described above. The passage structures can be introduced into the base plates 90, 91 or into the porous layer 2 for example by being pressed in or by using micromechanical methods, for example by etching.

Figure 5:
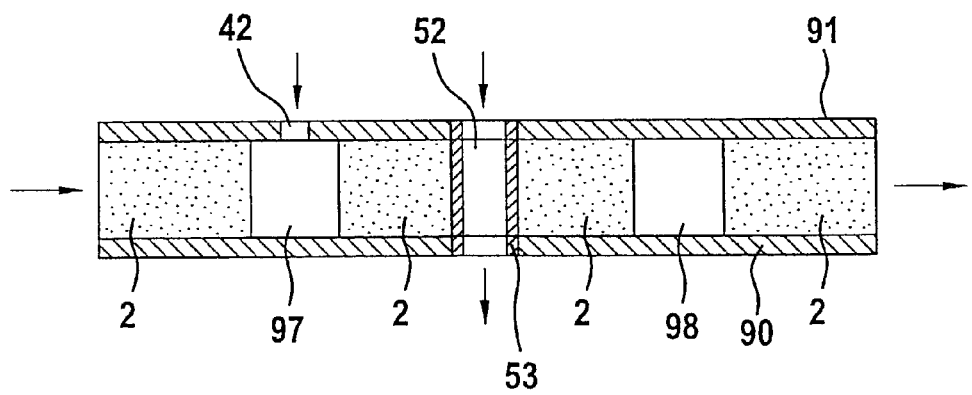
FIG. 5 shows a section of a further exemplary embodiment of a plate according to the invention, partly covered with a porous layer.

Base plates 90, 91 are likewise provided in the exemplary embodiment shown in FIG. 5. In this case, however, these base plates 90, 91 are only partly covered with a porous layer 2. Regions 97, 98 without a porous layer 2 may be provided between such part-layers 2. These regions 97, 98 can be used as a mixing or reaction space. Moreover, a feed passage 42 and a heating passage 52 with associated wall 53 are shown in order to explain the principle of this embodiment. In this case too it is, of course, possible, if necessary, to provide further openings or passages for supplying fluids and/or controlling the temperature of the regions.

In addition to the exemplary embodiments which have been specifically illustrated, it is also possible to combine the teaching of these different variants with one another. Moreover, to extend the functionality, it is possible to use the passages to selectively supply and discharge fluids to and from the gas stream. For this purpose, the wall of one or more passages may be provided with a correspondingly selective material. For example, it is possible to separate hydrogen from a gas-mixture flow with the aid of a palladium foil. Correspondingly, it is possible for oxygen from the ambient air to be introduced selectively into the gas stream.

Various embodiments allowing individual components to be integrated into a common plate 2 of this type, which at least partially comprises a porous layer formed by pressing catalyst material, are shown in FIGS. 6 to 10.

Figure 6:
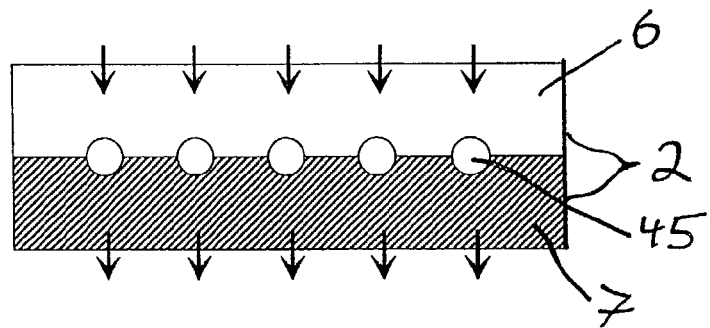
FIG. 6 shows a section of a first exemplary embodiment of a plate according to the invention with a porous layer for the integration of reforming and selective oxidation.

FIG. 6 shows a segment of a plate 2 of this type, comprising two porous, catalytically active layers. The first layer, which is designed as a reforming region 6, is used to convert the starting materials. In the second layer, which is designed as a CO oxidation region 7, an additionally metered oxidizing agent, preferably air, is used for selective catalytic oxidation of the carbon monoxide contained in the exhaust gas of the reforming region 6. In the process, the starting materials, which under certain circumstances may also contain air, flow through the two layers 6, 7 substantially perpendicular to their longitudinal extent, additional metering of air for the CO oxidation region 7 taking place between the two layers 6, 7 via passages 45.

Figure 7:
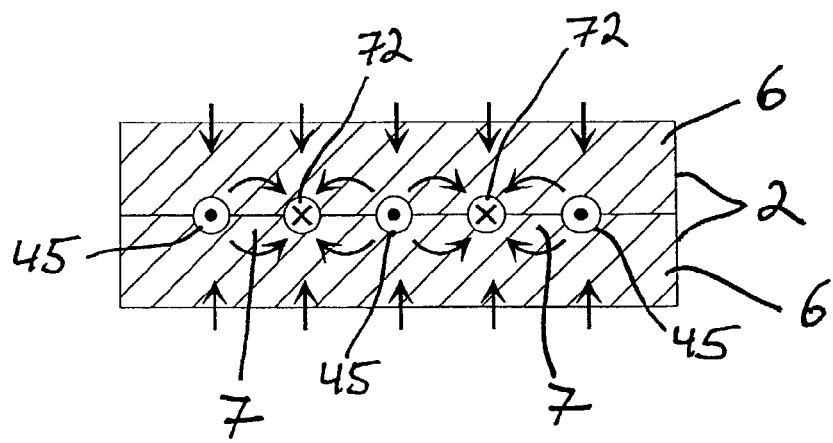
FIG. 7 shows a section of a second exemplary embodiment of a plate according to the invention with a porous layer for the integration of reforming and selective oxidation.

FIG. 7 likewise shows a segment of a plate 2 of this type, comprising two porous, catalytically active layers, into which passages 72, 45 for product discharge and for additional metering of air are alternately integrated. The two layers 6 are in each case designed as a reforming region 6. In the boundary layer between the two reforming regions 6, the additionally metered oxidizing agent, preferably air, is used for selective catalytic oxidation of the carbon monoxide contained in the exhaust gas from the reforming. The region between the two passages 72, 45, which is designed as a CO oxidation region, is therefore used for selective catalytic oxidation of the carbon monoxide. In this arrangement, the starting materials, which under certain circumstances may also contain air, flow through the two reforming regions 6 substantially from the outside inwards.

Figure 8:
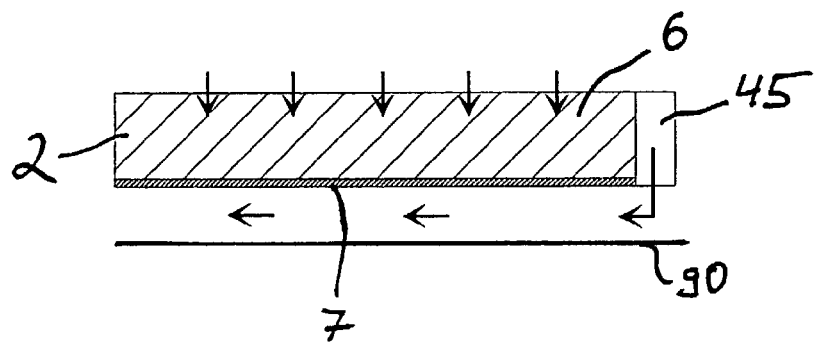
FIG. 8 shows a section of a third exemplary embodiment of a plate according to the invention with a porous layer for the integration of reforming and selective oxidation.

A further exemplary embodiment for integrating a reforming region 6 and a CO oxidation unit 7 in a plate 2 is shown in FIG. 8. In this case, the starting materials once again flow through the layer in the reforming region 6, while in the CO oxidation region 7 the exhaust gas from the reforming flows over the layer. The air required for selective catalytic oxidation is supplied via a passage 45. Furthermore, in this exemplary embodiment there is a base plate 90 for forming a discharge passage. In the discharge passage, the air becomes mixed with the exhaust gas from the reforming, so that selective catalytic oxidation takes place during flow over the plate 2.

Figure 9:
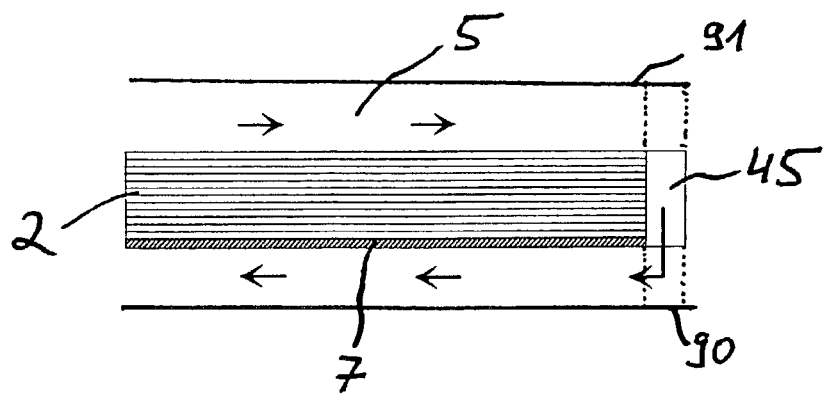
FIG. 9 shows a section of an exemplary embodiment of a plate according to the invention with a porous layer for the integration of evaporation and selective oxidation.

The exemplary embodiment shown in FIG. 9 illustrates the combination of an evaporation region 5 and a CO oxidation region 7 in a common plate 2, the respective media flowing over both sides of the plate 2. In addition, further base plates 90, 91 are provided for the purpose of forming feed and discharge passages. A carbon monoxide-containing product gas, to which air is supplied via a passage 45, is passed through the discharge passage. This gas mixture then undergoes selective catalytic oxidation in the CO oxidation region 7 as it flows over the layer. This oxidation is exothermic, so that thermal energy is transferred via the plate 2 to the opposite layer. In the evaporation region 5 in that opposite layer, the liquid starting materials absorb this thermal energy and, in the process, are evaporated.

Figure 10:
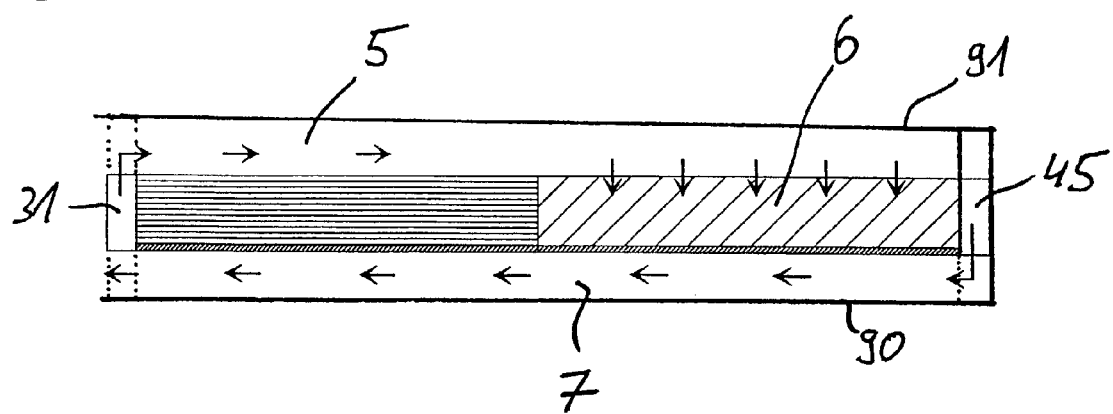
FIG. 10 shows a section of an exemplary embodiment of a plate according to the invention having a porous layer for the integration of evaporation, reforming and selective oxidation.

Finally, the exemplary embodiment shown in FIG. 10 illustrates the combination of an evaporation region 5, a reforming region 6 and a CO oxidation region 7 in a common plate 2, the respective media flowing over the plate 2 in the evaporation region 5 and the CO oxidation region 7, while in the reforming region 6 the media flow through the plate 2. In addition, base plates 90, 91 are also provided for the purpose of forming feed and discharge passages. Once again, a carbon monoxide-containing product gas, to which air is supplied via a passage 45 and which originates from the reforming region 6, is passed through the discharge passage. This gas mixture then undergoes selective catalytic oxidation in the CO oxidation region 7 as it flows over the layer. This oxidation is exothermic, so that once again thermal energy is transferred to the opposite layer via the plate 2. In the evaporation region 5 in that layer, the liquid starting materials absorb this thermal energy and as a result are evaporated, and are then fed to the reforming region 6. The liquid starting materials are fed into the evaporation region 5 via a passage 31, which extends through the plate 2 perpendicular to the plane of the plate.

The principle of how the arrangement shown in FIGS. 1 to 5 can be designed in order to effect the various connections of a plurality of the components 3–7 in a single plate 2 can be seen from the exemplary embodiments shown in FIGS. 6 to 10. Of course, it is possible for a plurality of the exemplary embodiments shown in FIGS. 6 to 10 to be combined and integrated in a single plate 2. Naturally, devices of this type generally also have housing walls and end plates, as well as any further components. However, for simplification and in order to explain the connection principle, details have been omitted. As has already been explained above, the passages may be formed in various ways.

The invention claimed is:

1. A device for generating a hydrogen-rich gas from a liquid, hydrogen-containing fuel using a reforming reaction, comprising:
   feed lines for supplying starting materials;
   discharge lines for discharging the reformate;
   at least one component for evaporating liquid starting materials;
   at least one component for reforming;
   at least one component for the catalytic generation of thermal energy; and
   at least one component for reducing the carbon monoxide level in the reformate;
   wherein at least two of said components are formed as integral portions of a common plate, which at least partially comprises a porous layer of pressed catalyst material, through which the reaction starting materials can flow, at least in regions, with a pressure drop.

2. The device according to claim 1, wherein all of said components are formed in said a common plate.

3. The device according to claim 1, wherein the plate is formed all the way through from the porous layer formed by pressing catalyst material.

4. The device according to claim 1, wherein the porous layer has gas-impermeable regions.

5. The device according to claim 1, wherein the plate has a continuous base plate which, in partial regions, has a porous layer.

6. The device according to claim 1, wherein flow-guiding structures are made in a surface of the plate which is in contact with the gas flow.

7. The device according to claim 1, wherein a plurality of plates are stacked on top of one another, the inlets and outlets being formed by passages which are formed by openings in the plates when the plates are stacked.

8. The device according to claim 1, wherein further inlets are provided, which during the flow over or through the plates, open out into the gas flow path.

9. The device according to claim 1, wherein passages which run independently of the starting-material flow are provided for temperature control purposes.

10. The device according to claim 9, wherein a heat transfer medium is carried in the passages.

11. The device according to claim 9, wherein a reaction mixture is carried in the passages and can be catalytically converted in order to generate thermal energy.

12. The device according to claim 1, wherein passages, are provided which are connected in terms of flow to the starting gas stream via a membrane for selectively supplying or discharging a fluid.

13. The device according to claim 1, wherein the porous layer is formed by pressing the catalyst material to a mesh-like support structure made from copper.

14. The device according to claim 13, wherein the mesh-like support structure comprises dendritic copper.

15. An assembly for generating a hydrogen rich gas from a liquid, hydrogen containing fuel using a reforming reaction, comprising:
   feed lines for supplying starting materials;
   discharge lines for discharging the reformate;
   an evaporating component for evaporating liquid starting materials;
   a reforming component for reforming;
   a catalytic component for the catalytic generation of thermal energy; and
   a reducing component for reducing the carbon monoxide level in the reformate;
   wherein at least two of the components are formed as integral portions of a single porous catalyst plate that comprises a substantially planar and continuous elongate layer of pressed catalyst material; and
   said at least two components are arranged along a flow path for said starting materials, which flow path is contained within said layer, and is oriented in a direction parallel to a longitudinal axis of said layer.

16. The assembly according to claim 15, wherein all the components are arranged on a common plate.

17. The assembly according to claim 15, wherein the plate is formed all the way through from the porous layer formed by pressing catalyst material.

18. The assembly according to claim 15, wherein the porous layer has gas-impermeable regions.

19. A method of making an assembly for generating a hydrogen rich gas from a liquid, hydrogen containing fuel using a reforming reaction, comprising:
   feed lines for supplying starting materials;
   discharge lines for discharging the reformate;

an evaporating component for evaporating liquid starting materials;

a reforming component for reforming;

a catalytic component for the catalytic generation of thermal energy; and a reducing component for reducing the carbon monoxide level in the reformate;

said method including forming at least two of the components as integral portions of a single porous catalyst plate; wherein, said catalyst plate comprises a substantially planar and contiuous elongate layer of pressed catalyst material; and said at least two components are arranged along a flow path for said starting materials, which flow path is contained within said layer, and is oriented in a direction parallel to a longitudinal axis of said layer.

20. The method according to claim 19, wherein all the components are formed as integral portions of said catalyst plate.

21. The method according to claim 19, wherein said at least two components are arranged consecutively within said flow path.

22. The method according to claim 19, wherein the porous layer has gas-impermeable regions.

* * * * *